(12) United States Patent
Nakatomi

(10) Patent No.: US 12,271,027 B2
(45) Date of Patent: Apr. 8, 2025

(54) OPTICAL CIRCUIT BOARD AND ELECTRONIC COMPONENT MOUNTING STRUCTURE USING SAME

(71) Applicant: KYOCERA Corporation, Kyoto (JP)

(72) Inventor: Yoshinori Nakatomi, Nagahama (JP)

(73) Assignee: KYOCERA Corporation, Kyoto (JP)

( * ) Notice: Subject to any disclaimer, the term of this patent is extended or adjusted under 35 U.S.C. 154(b) by 312 days.

(21) Appl. No.: 17/629,155

(22) PCT Filed: May 12, 2020

(86) PCT No.: PCT/JP2020/018986
§ 371 (c)(1),
(2) Date: Jan. 21, 2022

(87) PCT Pub. No.: WO2021/014720
PCT Pub. Date: Jan. 28, 2021

(65) Prior Publication Data
US 2022/0268998 A1 Aug. 25, 2022

(30) Foreign Application Priority Data
Jul. 25, 2019 (JP) .................................. 2019-136935

(51) Int. Cl.
*G02B 6/12* (2006.01)
*G02B 6/122* (2006.01)
*G02B 6/126* (2006.01)

(52) U.S. Cl.
CPC ......... *G02B 6/12004* (2013.01); *G02B 6/122* (2013.01); *G02B 2006/12061* (2013.01); *G02B 6/126* (2013.01)

(58) Field of Classification Search
CPC ............................ G02B 6/122; G02B 6/12004
See application file for complete search history.

(56) References Cited

U.S. PATENT DOCUMENTS

| 8,534,927 B1 * | 9/2013 | Barwicz | G02B 6/3885 385/60 |
| 2002/0097962 A1 * | 7/2002 | Yoshimura | G02B 6/124 385/16 |

(Continued)

FOREIGN PATENT DOCUMENTS

| JP | 2007-187871 A | 7/2007 |
| JP | 6290742 B2 | 2/2018 |
| JP | 2018-141910 A | 9/2018 |

*Primary Examiner* — Eric Wong
(74) *Attorney, Agent, or Firm* — Volpe Koenig

(57) ABSTRACT

An optical circuit board includes a wiring board and an optical waveguide located on a surface of the wiring board. The optical waveguide includes a lower cladding layer, a core, and an upper cladding layer disposed in this order from the wiring board. The lower cladding layer includes a first region including an opening portion, and a second region in which the core and the upper cladding layer are disposed in this order, the second region being adjacent to the first region. The core includes an exposed portion having the upper cladding layer not disposed in the first region. Furthermore, at least one supporting member is disposed in a circumference edge portion of the opening portion, in the first region of the lower cladding layer, and a difference between a height of the supporting member and a height of the exposed portion in the core is 5% or less.

8 Claims, 5 Drawing Sheets

(56) References Cited

U.S. PATENT DOCUMENTS

2012/0020612 A1\* 1/2012 Ito .................... G02B 6/4246
385/14
2017/0139134 A1 5/2017 Dangel et al.
2019/0265415 A1\* 8/2019 Psaila ............... G02B 6/29331

\* cited by examiner

OPTICAL CIRCUIT BOARD AND ELECTRONIC COMPONENT MOUNTING STRUCTURE USING SAME

TECHNICAL FIELD

The present invention relates to an optical circuit board and an electronic component mounting structure using the same.

BACKGROUND ART

In recent years, optical communication networks capable of communicating large amounts of data at high speed have expanded, and various optical communication devices utilizing such optical communication networks exist. Examples of such devices include devices employing silicon photonics technology as described in Patent Document 1.

CITATION LIST

Patent Literature

Patent Document 1:JP 6290742 B

SUMMARY OF INVENTION

An optical circuit board according to the present disclosure includes a wiring board and an optical waveguide located on a surface of the wiring board. The optical waveguide includes a lower cladding layer, a core, and an upper cladding layer that are disposed in this order from the wiring board. The lower cladding layer includes a first region including an opening portion in plan view, and a second region in which the core and the upper cladding layer are disposed in this order, the second region being adjacent to the first region. The core includes an exposed portion in which the upper cladding layer is not disposed in the first region. Furthermore, at least one supporting member is disposed in a circumference edge portion of the opening portion, in the first region of the lower cladding layer, and a difference between a height of the supporting member and a height of the exposed portion in the core is 5% or less.

An electronic component mounting structure according to the present disclosure includes the above-described optical circuit board and a silicon photonics device. The silicon photonics device includes a silicon waveguide, a light source unit, and a photodetection unit, and is electrically connected to the optical circuit board, and the silicon waveguide and the exposed portion of the core of the optical waveguide face each other and are in contact with each other.

DESCRIPTION OF EMBODIMENTS

When a silicon photonics device is mounted on an optical circuit board, the silicon photonics device is preferably mounted to be substantially parallel to the optical circuit board, to prevent optical reliability from being compromised. To thus mount the silicon photonics device to be substantially parallel to the optical circuit board, for example, the amount (height) of solder for electrically connecting the silicon photonics device with the optical circuit board or the like is adjusted. However, despite the adjustment of the amount (height) of the solder or the like, the silicon photonics device is often inclined relative to the optical circuit board on which the silicon photonics device is mounted.

The optical circuit board according to the present disclosure has a supporting member, having substantially the same height as a core, provided in at least one portion of a circumference edge portion of an opening portion of a lower cladding layer included in an optical waveguide. Thus, with the optical circuit board according to the present disclosure, the inclination of the silicon photonics device mounted thereon can be reduced. Accordingly, the silicon photonics device is mounted to be substantially parallel to the optical circuit board, whereby the optical reliability of the resultant electronic component mounting structure is less likely to be compromised.

Figure 1:
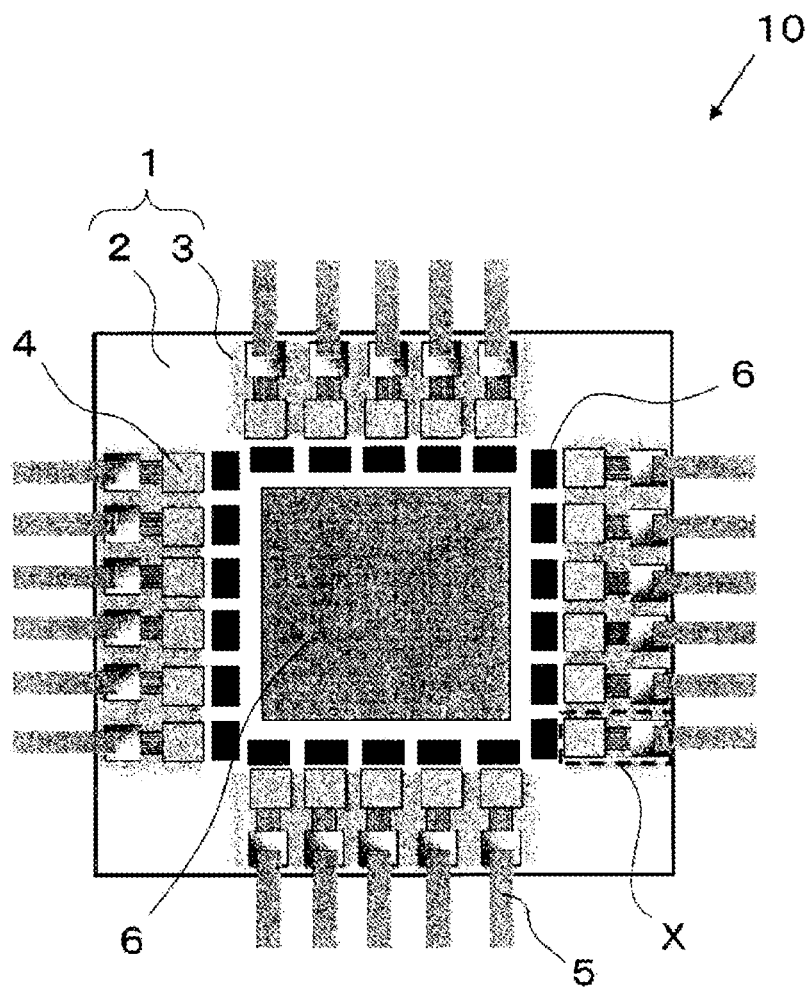
FIG. 1 is a plan view illustrating an electronic component mounting structure in which a silicon photonics device is mounted on an optical circuit board according to an embodiment of the present disclosure.

An optical circuit board according to an embodiment of the present disclosure will be described with reference to FIGS. 1 and 2. FIG. 1 is a plan view illustrating an electronic component mounting structure 10 in which a silicon photonics device 4 is mounted on an optical circuit board 1 according to an embodiment of the present disclosure.

The optical circuit board 1 according to the embodiment of the present disclosure includes a wiring board 2 and an optical waveguide 3. The wiring board 2 included in the optical circuit board 1 according to the embodiment includes a wiring board typically used in optical circuit boards.

Such a wiring board 2 includes, for example, a core substrate and build-up layers layered on both surfaces of the core substrate. The core substrate is not particularly limited as long as the core substrate is formed of a material having an insulating property. Examples of the material having an insulating property include resins such as an epoxy resin, a bismaleimide-triazine resin, a polyimide resin, and a polyphenylene ether resin. Two or more of these resins may be mixed and used. Generally, a through hole conductor is formed in the core substrate to electrically connect the upper and lower surfaces of the core substrate.

The core substrate may contain a reinforcing material. Examples of the reinforcing material include insulating fabric materials such as glass fiber, glass non-woven fabric, aramid non-woven fabric, aramid fiber, and polyester fiber. Two or more types of reinforcing materials may be used in combination. Further, an inorganic insulating filler made of, for example, silica, barium sulfate, talc, clay, glass, calcium carbonate, titanium oxide, or the like may be dispersed in the core substrate.

The build-up layers have a structure in which insulating layers and conductor layers are alternately layered. As with the core substrate, the insulating layers included in the build-up layers are not particularly limited as long as the insulating layers are formed of a material having an insulating property. Examples of the material having an insulating property include resins such as an epoxy resin, a bismaleimide-triazine resin, a polyimide resin, and a polyphenylene ether resin. Two or more of these resins may be mixed and used. When two or more insulating layers are present in the build-up layers, the insulating layers may be formed of the same resin or may be formed of different resins. The insulating layers included in the build-up layers and the core substrate may be formed of the same resin or may be formed of different resins. Generally, via hole conductors for electrically connecting the layers are formed in the insulating layers included in the build-up layers.

Further, an inorganic insulating filler made of, for example, silica, barium sulfate, talc, clay, glass, calcium carbonate, titanium oxide, or the like may be dispersed in the insulating layers included in the build-up layers.

A solder resist may be formed on a part of both surfaces of the wiring board 2. The solder resist is formed of, for example, an acryl-modified epoxy resin.

Figure 2A:
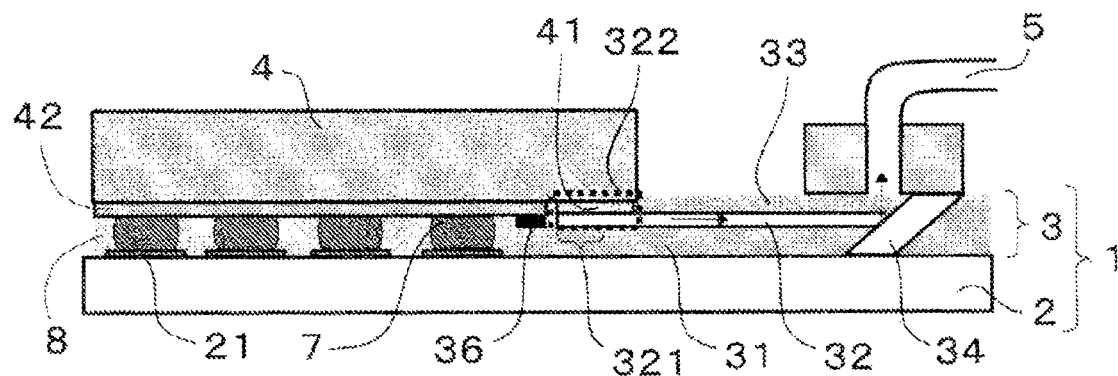
FIG. 2(A) is an enlarged explanatory diagram illustrating a cross section of a region X illustrated in FIG. 1.

The optical waveguide 3 included in the optical circuit board 1 according to the embodiment is disposed on a surface of the wiring board 2. As illustrated in FIG. 2(A), the optical waveguide 3 has a structure in which a lower cladding layer 31, a core 32, and an upper cladding layer 33 are layered in this order from the wiring board 2. FIG. 2(A) is an enlarged explanatory diagram illustrating a cross section of a region X illustrated in FIG. 1.

The lower cladding layer 31 included in the optical waveguide 3 is located on a surface of the wiring board 2. The material forming the lower cladding layer 31 is not limited, and examples thereof include an epoxy resin, a silicone resin, or the like.

The upper cladding layer 33 included in the optical waveguide 3 is also formed of the same material as or a similar material to the lower cladding layer 31. The lower cladding layer 31 and the upper cladding layer 33 may be formed of the same material or may be formed of different materials. The lower cladding layer 31 and the upper cladding layer 33 may have the same thickness or may have different thicknesses. For example, the lower cladding layer 31 and the upper cladding layer 33 each have a thickness of from approximately 10 µm to approximately 50 µm.

The core 32 included in the optical waveguide 3 is a portion through which light that has entered the optical waveguide 3 propagates. The material forming the core 32 is not limited, and is set as appropriate in consideration of, for example, permeability to light, wavelength characteristics of light propagating therethrough, and the like. Examples of the material include an epoxy resin, a silicone resin, and the like. The core 32 has a thickness of from approximately 2 µm to approximately 10 µm, for example.

In the core 32, an end portion 321 on a side closer to an opening portion 311 described below has an exposed portion 322 that is not covered by the upper cladding layer 33. In FIG. 2(A), the exposed portion 322 is a portion in which the core 32 included in the optical waveguide 3 and a silicon waveguide (Si waveguide) 41 included in the silicon photonics device 4 described below face each other. Specifically, in this exposed portion 322, an upper portion of the core 32 and a lower portion of the Si waveguide 41 are in contact with each other, and an optical signal is transmitted and received therebetween.

The optical waveguide 3 further includes a reflective mirror portion 34. The reflective mirror portion 34 is provided to change the orientation of light propagating in the core 32. The reflective mirror portion 34 is formed so as to pass through the lower cladding layer 31, the core 32, and the upper cladding layer 33, in the thickness direction. The reflective mirror portion 34 is not formed parallel to the thickness direction of the optical waveguide 3, but is formed so as to be inclined with respect to the thickness direction. The inclination angle is set as appropriate according to an optical fiber, an optical element, or the like to be connected to the optical waveguide 3.

Figure 2B:
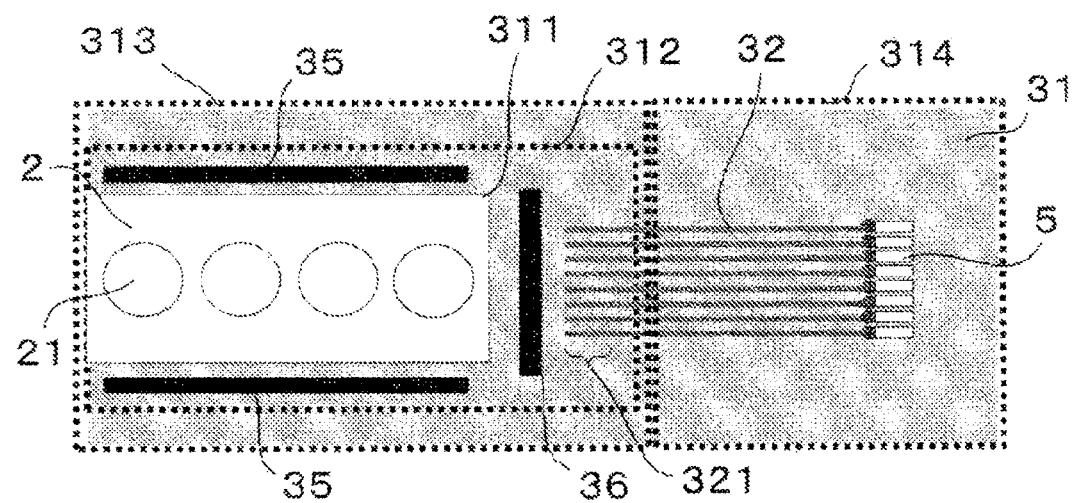
FIG. 2(B) is a plan view of the region X illustrated in FIG. 1 (in which the silicon photonics device and an upper cladding layer are omitted).

FIG. 2(B) is a plan view of the region X illustrated in FIG. 1. The opening portion 311 is formed in the lower cladding layer 31 included in the optical waveguide 3, as illustrated in FIG. 2(B). In the lower cladding layer 31, a region including the opening portion 311 is a "first region 313", and a region adjacent to the first region 313 and having the core 32 and the upper cladding layer 33 disposed in this order in the thickness direction of the optical waveguide 3 is a "second region 314". FIG. 2(B) illustrates a state in which the silicon photonics device 4 and the upper cladding layer 33 included in the optical waveguide 3 illustrated in FIG. 1 are omitted. Actually, the silicon photonics device 4 is mounted on a silicon photonics device mounting portion 312. The opening portion 311 is formed to expose an electrode 21 with which the optical circuit board 1 and the silicon photonics device 4 are electrically connected to each other. Thus, a region including the silicon photonics device mounting portion 312 is the first region 313. A region that is adjacent to the first region 313 and in which an optical transmission path including the upper cladding layer 33 is disposed is the second region 314. The electrode 21 is formed of a conductor such as metal, and is formed on the surface of the wiring board 2.

The opening portion 311 is formed through the lower cladding layer 31 from the upper surface to the lower surface. The size of the opening portion 311 is not limited, and is set as appropriate according to the size of the silicon photonics device 4 to be mounted.

The circumference edge portion of the opening portion 311 of the lower cladding layer 31 included in the optical waveguide 3 is provided with a supporting member 35. A difference between the height of the supporting member 35 and the height of the exposed portion 322 in the core 32 included in the optical waveguide 3 is 5% or less and may be 0.5% or less. The supporting member 35 is formed of a resin such as any one of epoxy, acrylic, siloxane, silicone, polyimide, polysilane, polynorbornene, and fluorocarbon resins. The supporting member 35 and the core 32 included in the optical waveguide 3 may be formed of the same material.

Since the optical circuit board 1 according to the embodiment includes the supporting member 35, the inclination of the silicon photonics device 4 can be reduced with the silicon photonics device 4 mounted while having a lower portion in contact with the upper portion of the supporting member 35. Furthermore, the supporting member 35 has substantially the same height as the core 32. This configuration advantageously facilitates the maintaining of the contact state between the upper portion of the core 32 in the exposed portion 322 and the lower portion of the Si waveguide 41.

The optical circuit board 1 according to the embodiment further includes an optical path member 36 including a light entry portion and a light emission portion. As illustrated in FIG. 2(B), the optical path member 36 is provided in a region between the exposed portion 322 of the core 32 on the upper surface of the lower cladding layer 31 included in the optical waveguide 3 and the opening portion 311 of the lower cladding layer 31 in plan view. A difference between the height of the optical path member 36 and the height of the exposed portion 322 in the core 32 included in the optical waveguide 3 is 5% or less and may be 0.5% or less. The optical path member 36 is formed of a resin such as one of epoxy, acrylic, siloxane, silicone, polyimide, polysilane, polynorbornene, and fluorocarbon resins. The optical path member 36 and the supporting member 35 may be formed of the same material. The optical path member 36, the supporting member 35, and the core 32 included in the optical waveguide 3 may be formed of the same material.

The optical circuit board 1 according to the embodiment includes the optical path member 36, whereby the inclination of the silicon photonics device 4 mounted thereon can be further reduced. Specifically, with the silicon photonics device 4 mounted while having the lower portion in contact with the upper portion of the supporting member 35 and on the upper portion of the optical path member 36 having the same height as the core 32, the regions supporting the silicon photonics device 4 can be increased, whereby the inclination can be further reduced.

Furthermore, even when an underfill 8 described below is used while the silicon photonics device 4 is mounted, the optical path member 36 functions as a dam. Thus, a flow of the underfill 8 into a portion (coupling portion) where an optical signal is transmitted and received between the core 32 included in the optical waveguide 3 and the Si waveguide 41 included in the silicon photonics device 4 can be reduced. When the underfill 8 flows into the coupling portion, not only is the inclination of the silicon photonics device 4 facilitated but also the propagation of the optical signal is negatively affected.

The optical circuit board 1 according to the embodiment includes the optical path member 36 including the light entry portion and the light emission portion, whereby the coupling state can be confirmed before an optical fiber 5 is mounted. Specifically, whether a coupling failure is occurring between the core 32 included in the optical waveguide 3 and the Si waveguide 41 included in the silicon photonics device 4 can be confirmed before the optical fiber 5 is mounted. This will be described in detail below.

The shape of the optical path member 36 is not limited. As illustrated in FIG. 2(B), the optical path member 36 may have a linear shape in plan view, or as illustrated in FIG. 3, may have a shape with end portions curved in plan view.

Figure 4:
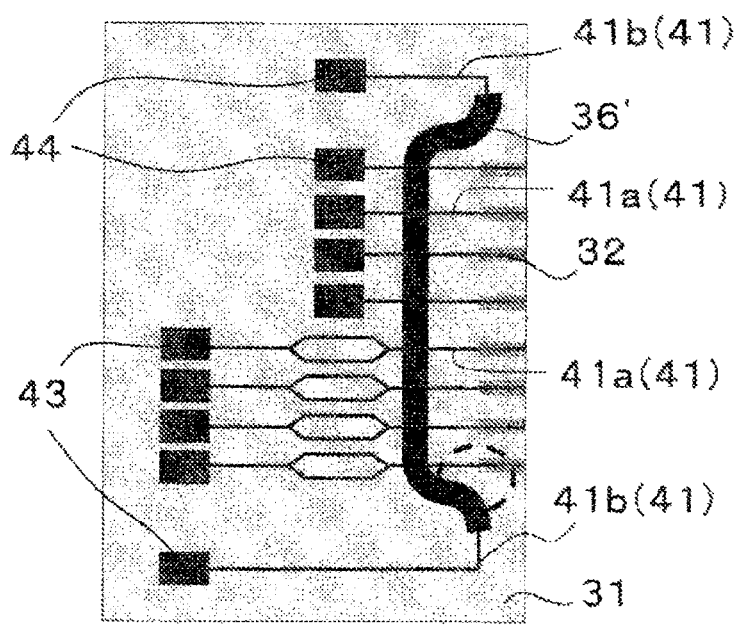
FIG. 4 is an explanatory diagram illustrating a method for determining a coupling state between an optical waveguide included in the optical circuit board and the silicon photonics device according to the embodiment of the present disclosure.

A method of determining whether a coupling failure is occurring between the core 32 included in the optical waveguide 3 and the Si waveguide 41 included in the silicon photonics device 4 will be described with reference to FIG. 4. First, as illustrated in FIG. 2(A) and FIG. 4, the silicon photonics device 4 includes the Si waveguide 41, a protective film (passivation film) 42, a light source unit 43, and a photodetection unit 44. The Si waveguide 41 includes a Si waveguide 41a for signal propagation and a Si waveguide 41b for position accuracy detection. FIG. 4 is a perspective view of the coupling portion from the upper surface with the passivation film 42 included in the silicon photonics device 4 omitted. The Si waveguide 41a for signal propagation and the Si waveguide 41b for position accuracy detection are disposed at predetermined positions to be connectable to the core 32 and an optical path member 36' disposed in the optical waveguide 3, respectively. Specifically, the Si waveguide 41a for signal propagation and the Si waveguide 41b for position accuracy detection are disposed in the silicon photonics device 4 to correspond to the arrangement of the core 32 and the optical path member 36' disposed in the optical waveguide 3.

As illustrated in FIG. 2(A), the silicon photonics device 4 is electrically connected to the wiring board 2 via a solder 7. An electrical signal from the wiring board 2 propagates to the light source unit 43 included in the silicon photonics device 4 via the solder 7. The light source unit 43 emits light upon receiving the electrical signal thus propagated. The optical signal of this emitted light propagates to the optical fiber 5 via the Si waveguide 41a for signal propagation and the core 32 of the optical waveguide 3. An optical signal of light emitted by another light source unit 43 propagates to the photodetection unit 44 via the Si waveguide 41b for position accuracy detection and the optical path member 36' provided in the lower cladding layer 31 of the optical waveguide 3. If the photodetection unit 44 fails to detect the optical signal or if the detected optical signal is weak, it can be confirmed that the positional accuracy between the silicon photonics device 4 and the optical waveguide 3 is poor. Thus, it is possible to confirm that the positional accuracy between the Si waveguide 41b for position accuracy detection and the optical path member 36' is poor. Therefore, it is also possible to confirm that the positional accuracy between the Si waveguide 41a for signal propagation and the core 32 is poor. In this manner, it is possible to confirm whether a coupling failure is occurring between the Si waveguide 41a for signal propagation and the core 32, before the optical signal is actually transmitted with the optical fiber 5 mounted.

Figure 3:
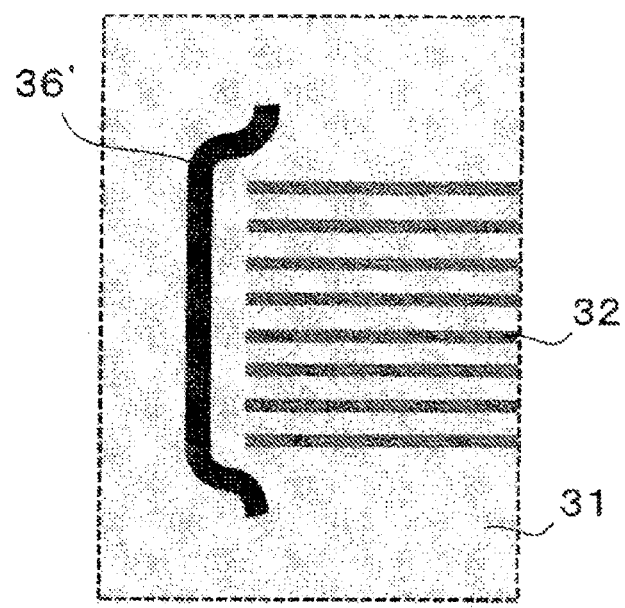
FIG. 3 is an explanatory diagram illustrating a variation of an optical path member included in the optical circuit board according to the embodiment of the present disclosure.

For example, when the optical path member 36' has a shape with the end portions curved as illustrated in FIG. 3, it is possible to confirm more accurately whether a coupling failure is occurring. This is because, as illustrated in a portion in FIG. 4 enclosed by a dashed line, the detection portion is close to the coupling portion between the Si waveguide 41a for signal propagation and the core 32, the detection portion being an actual optical signal connecting portion.

Next, an electronic component mounting structure of the present disclosure will be described. The electronic component mounting structure 10 according to an embodiment of the present disclosure has a structure in which the silicon photonics device 4 is mounted on the optical circuit board 1 according to an embodiment. Furthermore, the electronic component mounting structure 10 according to the embodiment of the present disclosure includes an electronic component 6 and is connected to the optical fiber 5. Examples of the electronic component 6 include an Application Specific Integrated Circuit (ASIC), a driver IC, and the like.

The silicon photonics device 4 is one type of optical waveguide having, for example, silicon (Si) serving as a core and silicon dioxide ($SiO_2$) serving as a cladding, and as described above, includes the Si waveguide 41, the passivation film 42, the light source unit 43, and the photodetection unit 44.

As illustrated in FIGS. 2(A) and 2(B), the silicon photonics device 4 is electrically connected to the silicon photonics device mounting portion 312, via the wiring board 2 and the solder 7, so as to cover the opening portion 311 formed in the lower cladding layer 31 and the supporting member 35. The opening portion 311 formed in the lower cladding layer 31 is filled with the underfill 8. The underfill 8 is not limited as long as it is a resin that can be generally used as a sealing resin. Examples of such a resin include a resin such as one of epoxy, acrylic, siloxane, silicone, polyimide, polysilane, polynorbornene, and fluorocarbon resins.

In the electronic component mounting structure 10 according to the embodiment, the Si waveguide 41 and the exposed portion 322 of the core 32 of the optical waveguide 3 face each other. Furthermore, the light source unit 43 of the silicon photonics device 4 and the light entry portion of the optical path member 36', as well as the photodetection unit 44 of the silicon photonics device 4 and the light emission portion of the optical path member 36' are optically connected to each other.

With such a configuration, in the electronic component mounting structure 10 according to the embodiment, the silicon photonics device 4 is mounted so as to be substantially parallel to the optical circuit board 1 almost without being inclined at all. As a result, the electronic component mounting structure 10 according to an embodiment is less likely to have its electrical reliability compromised. Furthermore, as described above, it is possible to confirm whether a coupling failure is occurring before the optical fiber 5 is mounted.

The optical circuit board of the present disclosure is not limited to the embodiment described above. For example, as illustrated in FIG. 2(B), with the opening portion 311 in the optical circuit board 1 described above, the lower cladding layer 31 included in the optical waveguide 3 is cut to have a so-called "U shape". Furthermore, in FIG. 2(B), two supporting members 35 are formed in the first region 313 of the lower cladding layer 31 and disposed to face each other with the opening portion 311 provided therebetween.

Figure 5:
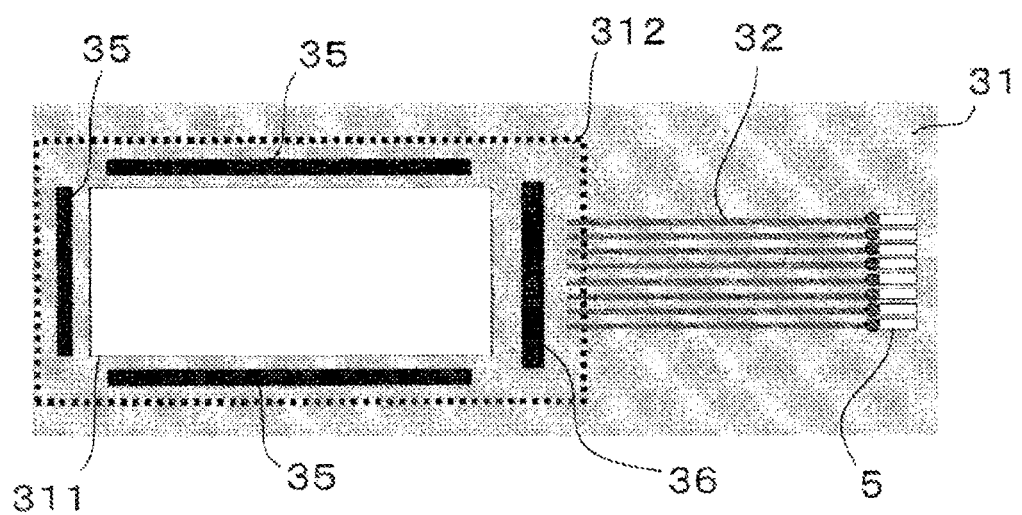
FIG. 5 is an explanatory diagram illustrating a variation of an opening portion formed in the optical circuit board according to the embodiment of the present disclosure.

However, in the optical circuit board of the present disclosure, the lower cladding layer 31 does not necessarily need to be cut to have a "U shape". For example, as illustrated in FIG. 5, the opening portion 311 may be formed so that the lower cladding layer 31 has a so-called "shape including a square hole". That is, in the present specification, the "opening portion" not only includes a shape with which the lower cladding layer 31 is cut out to have a "U shape", but also includes a shape with which a through hole portion is formed in the lower cladding layer 31.

As illustrated in FIG. 5, when the opening portion 311 has a shape with which the through hole portion is formed in the lower cladding layer 31, the first region 313 of the lower cladding layer 31 may have a plurality of supporting members 35 disposed in the vicinity of the respective sides of the circumference edge portion of the opening portion 311. The supporting member 35 may be provided in at least one portion of the circumference edge portion of the opening portion 311.

Furthermore, in FIG. 2(B) and FIG. 5, one supporting member 35 is formed along each side of the circumference edge portion of the opening portion 311. However, the number of the supporting members 35 need not be one. For example, in a plan view, a plurality of relatively short supporting members may be formed in the vicinity of each side of the circumference edge portion of the opening portion.

REFERENCE SIGNS LIST

1 Optical circuit board
2 Wiring board
21 Electrode
3 Optical waveguide
31 Lower cladding layer
311 Opening portion
312 Silicon photonics device mounting portion
313 First region
314 Second region
32 Core
321 End portion
322 Exposed portion
33 Upper cladding layer
34 Reflective mirror portion
35 Supporting member
36 Optical path member
4 Silicon photonics device
41 Silicon waveguide (Si waveguide)
42 Protective film (passivation film)
43 Light source unit
44 Photodetection unit
5 Optical fiber
6 Electronic component
7 Solder
8 Underfill
10 Electronic component mounting structure

The invention claimed is:

1. An optical circuit board comprising:
   a planar wiring board including a mounting portion in which an electrode is disposed; and
   an optical waveguide located on a surface of the wiring board, wherein
   the optical waveguide comprises a lower cladding layer, a core, and an upper cladding layer that are disposed in this order from the wiring board,
   the lower cladding layer comprises a first region extending to at least a pair of peripheries facing each other of the mounting portion and comprising an opening portion exposing the electrode, and a second region in which the core and the upper cladding layer are disposed in this order, the second region being adjacent to the first region,
   the core comprises an exposed portion in which the upper cladding layer is not disposed in the first region, and the exposed portion is adjacent to the second region,
   at least one supporting member is disposed in a circumference edge portion of the opening portion in the lower cladding layer in the mounting portion and is located on an opposite side of the second region away from the exposed portion, and
   a difference between a height of the supporting member and a height of the exposed portion in the core is 5% or less of a height of the core.

2. The optical circuit board according to claim 1, wherein the supporting member comprises two supporting members disposed in the first region of the lower cladding layer, while facing each other with the opening portion provided therebetween.

3. The optical circuit board according to claim 1, wherein in the first region of the lower cladding layer, a plurality of the supporting members are disposed along a side of the opening portion in plan view.

4. The optical circuit board according to claim 1, wherein a material of the supporting member and a material of the core are same.

5. The optical circuit board according to claim 1 further comprising:
   an optical path member comprising a light entry portion and a light emission portion, the optical path member being disposed between the exposed portion of the core and the opening portion in the first region, wherein a difference between a height of the optical path member and the height of the exposed portion in the core is 5% or less of the height of the core.

6. The optical circuit board according to claim 5, wherein a material of the optical path member and a material of the core are same.

7. The optical circuit board according to claim 6, wherein a material of the supporting member, the material of the optical path member, and the material of the core are same.

8. An electronic component mounting structure comprising:
- the optical circuit board described in claim 1; and
- a silicon photonics device, wherein
- the silicon photonics device comprises a silicon waveguide, a light source unit, and a photodetection unit, and is mounted on the supporting member of the optical circuit board and the exposed portion of the core to be electrically connected to the optical circuit board, and the silicon waveguide and the exposed portion of the core of the optical waveguide face each other and are in contact with each other.

* * * * *